United States Patent [19]

Wada et al.

[11] 4,229,568

[45] Oct. 21, 1980

[54] METHOD OF DISCHARGING GASEOUS VINYL CHLORIDE MONOMER FROM A POLYMERIZATION REACTOR

[75] Inventors: Norinobu Wada, Ibaragi; Yoshihiro Shirota, Yokohama, both of Japan

[73] Assignee: Shin-Etsu Chemical Co., Ltd., Japan

[21] Appl. No.: 7,570

[22] Filed: Jan. 29, 1979

Related U.S. Application Data

[63] Continuation of Ser. No. 830,066, Sep. 2, 1977, abandoned.

[30] Foreign Application Priority Data

Sep. 16, 1976 [JP] Japan .................................. 51-111215

[51] Int. Cl.$^2$ .............................................. C08F 6/24
[52] U.S. Cl. ............................... 528/500; 260/29.6 PT
[58] Field of Search ................. 528/500; 260/29.6 PT

[56] References Cited

U.S. PATENT DOCUMENTS

2,068,424   1/1937   Mark et al. ............................ 528/489

OTHER PUBLICATIONS

Chem. Eng., pp. 145–152 (6-5-67).

*Primary Examiner*—Standford M. Levin
*Attorney, Agent, or Firm*—McGlew and Tuttle

[57] ABSTRACT

The unreacted gaseous vinyl chloride monomer still remaining in a polymerization reactor from which the polymerizate has been removed can be discharged by blowing steam into the reactor from its top so that the gaseous monomer is pushed downward and moved out from the bottom of the reactor, followed by a conventional treatment for condensation. This method of discharge serves to put the reactor open to the ambient atmosphere without the emission of the unreacted monomer and, as such, solve the problems of the workers' health and environmental pollution.

3 Claims, 1 Drawing Figure

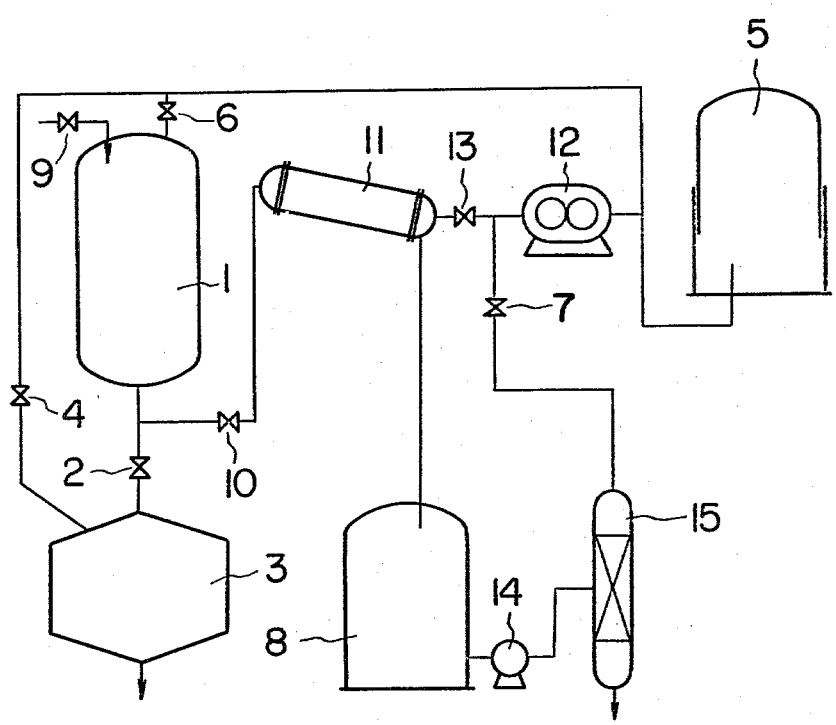

4,229,568

METHOD OF DISCHARGING GASEOUS VINYL CHLORIDE MONOMER FROM A POLYMERIZATION REACTOR

This is a continuation of application Ser. No. 830,066 filed Sept. 2, 1977 now abandoned.

BACKGROUND OF THE INVENTION

The present invention relates to an improvement in the process for the production of a polymerizate of vinyl chloride, vinylidene chloride or a monomer mixture mainly composed thereof in an aqueous medium in a polymerization reactor, by which the reactor can be opened to the ambient atmosphere without the emission of any unreacted residual monomer or monomers into the atmosphere, so that the residual monomers are completely recovered for re-use.

The polymerization of vinyl chloride, vinylidene chloride or a mixture thereof in an aqueous medium has generally been conducted, using a polymerization reactor containing the aqueous medium and closed hermetically or gas-tight. In the continuous repetition of polymerization runs, the inside of the reactor is required to be inspected from time to time.

When the inspection is carried out, it is a customary practice according to the inventors' plant that after the polymerization is over, the aqueous dispersion of the polymerizate is taken out of the reactor; then fresh air, preceded by nitrogen gas, is introduced to replace the gaseous monomer remaining in the same reactor, the gaseous monomer being emitted into the atmospheric environment; and thereupon the inspector or inspectors enter the reactor. Such a procedure is undesirable from the standpoint of atmospheric pollution because of the emission into the atmosphere of considerably large volumes of the unreacted gaseous monomer or monomers. Moreover, the procedure is disadvantaged by the fact that the replacement of the gaseous monomer by fresh air can not be complete enough, even with prolonged introduction of fresh air, to protect the inspectors entering the reactor from the toxicity of the unreacted gaseous monomer though in a very low concentration.

SUMMARY OF THE INVENTION

Therefore, it is an object of the present invention to provide a novel and improved process free from the above-described problems encountered in the prior art.

The improvement proposed by the present invention in a method for the production of a polymerizate of vinyl chloride monomer or a monomer mixture mainly composed thereof by polymerization in an aqueous medium contained in a polymerization reactor by the successive steps of equilibrating the pressure inside the reactor and a receiver tank connected to the reactor after completion of a polymerization reaction, removing most of the unreacted gaseous vinyl chloride monomer, transfering the aqueous dispersion of polymerizate from the reactor into the receiver tank, washing the interior of the polymerization reactor if necessary, and opening the reactor to the ambient atmosphere, comprises an additional step of blowing steam into the reactor from the top prior to the step of opening the reactor to ambient atmosphere, so that the unreacted gaseous monomer still remaining in the reactor is pushed downward and moved out from the bottom of the reactor. The gas moved out of the reactor is then transferred to a condenser where the unreacted monomer or monomers are separated to be recovered, while the condensation water produced is sent to a stripper where any unreacted monomer or monomers contained in the condensation water is separated to be recovered.

DETAILED DESCRIPTION OF THE PREFERRED EMBODIMENTS

In the improved process in accordance with the present invention, the unreacted gaseous monomer or monomers remaining in the polymerization reactor from which the aqueous dispersion of polymerizate has been removed to the receiver tank can be completely expelled and replaced with steam together with any other gaseous components. The thus expelled or discharged gaseous monomer or monomers are then separated from the steam by a conventional means using a condenser, and the thus separated monomer or monomer mixture is collected in a gas holder, while the condensation water produced which still contains unreacted monomer or monomers is treated by a stripper where the monomer or monomers are separated to be sent to the gas holder.

The process of the invention ensures the complete recovery of the unreacted monomer or monomers thereby to avoid the undesired emission of such unreacted monomer or monomers into the environment when the polymerization reactor is opened, e.g., for inspection, to the ambient atmosphere. This is an essential advantage of the present invention that the problems of workers' health and environmental pollution arising from the presence of unreacted monomer may become out of consideration.

The present invention will be better understood in connection with the accompaning drawing which is an overall diagram showing the production facilities for the production of vinyl chloride polymerizates in accordance with the invention.

Vinyl chloride monomer or a monomer mixture mainly composed of vinyl chloride is suspension- or emulsion-polymerized in an aqueous medium contained in a polymerization reactor 1 which is closed hermetically during the polymerization reaction concerned. After completion of the polymerization reaction, most of unreacted gaseous monomer or monomers staying in the reactor are recovered, and sent to a gas holder 5, and the aqueous dispersion of polymerizate formed in the reactor 1 is transferred to a receiver tank 3 located below through a discharge valve 2. Then the pressure inside polymerization reactor 1 and receiver tank 3 was equilibrated. This equilibration of the pressure is intended to facilitate the smooth transfer of the aqueous dispersion of polymerizate from the reactor to the receiver tank, and carried out by opening valves 4 and 6 on the piping conduit connecting the gaseous phases of the reactor and the receiver tank, and then opening a valve 2 to allow the aqueous dispersion to flow down into the receiver tank by gravity or by pumping means, while simultaneously the gas staying in receiver tank 3 is pushed and moved into reactor 1 and gas holder 5 through the piping.

It is recommended that, following the discharge of the aqueous dispersion of polymerizate from polymerization reactor 1 to receiver tank 3, the reactor walls are washed with a pressurized stream of water ejected from an automatic cleaner (not shown in the drawing) installed in the reactor to clean the wall surfaces of any aqueous dispersion or medium adhering thereto.

The aqueous dispersion of the polymerizate which has been transferred to receiver tank 3 is then dehydrated and dried, followed by usual processes to produce the finished product of polyvinyl chloride. When the polymerization reactor has been made empty and filled with fresh air, it is ready for next run of polymerization.

In accordance with the process of the present invention, the gases remaining in the polymerization reactor are swept and replaced with steam after every or several repeated polymerization runs, prior to the opening of the polymerization reactor to the ambient atmosphere, followed by the usual steps.

The replacement of the monomer and other gases with steam within polymerization reactor 1 is carried out by closing discharge valve 2 and equilibration valve 6, opening valve 10, and by supplying steam into reactor 1 through valve 9. The steam thus supplied works to gradually push the layer of the unreacted gaseous vinyl chloride monomer downward. In this case, the steam does not mix up with the gaseous monomer, since the density of the vinyl chloride monomer is more than 3 times that of steam under the same pressure and at the same temperature. The downward gaseous monomer and steam are then passed through valve 10 into condenser 11 where the steam is condensed to form condensation water which is to be sent to drain tank 8, while the gaseous monomer is made free of the steam. The freed gaseous monomer is then sent to gas holder 5 by means of blower 12 through valve 13.

The velocity of steam blown into the polymerization reactor should be carefully controlled. A too high velocity results in accelerating the mixing of the steam with the gaseous monomer, naturally leading to a remarkable reduction in the efficiency of replacement of the gases with steam. Thus, the velocity of blowing of steam is preferably 150 m/second or lower as determined at the blowing nozzle, while the rate of steam introduction is preferably 300 kg/hour or less per square meter of the horizontal cross sectional area of the polymerization reactor, which is of the vertical type.

The condensation water collected in drain tank 8 is sent by pump 14 to stripper 15 where it is stripped of the monomer dissolved therein. The vinyl chloride monomer vaporized in stripper 15 is sent to gas holder 5 by blower 12 through valve 7, while the water almost completely freed of the monomer, say, as small as 1 p.p.m. or less, is discharged out of stripper 15. The monomer collected and recovered in gas holder 5 may be recycled, after having been purified if necessary by suitable means, e.g. distillation.

In the blowing of steam into the polymerization reactor, the condensation of the steam at the reactor walls can effectively be prevented by passing hot water through the jackets surrounding the reactor. The replacement of the gases in the reactor can naturally be made more and more perfect by extending the time of steam blowing, or increasing the total volume of steam blown. Usually, a total volume of steam blown equivalent to 3 or more times the volume of the reactor taking several to several tens of minutes in blowing is sufficient to decrease the concentration of the monomer in the reactor to a value lower than 5 p.p,m., which is understood to be the statutory upper limit of pollution for working environment.

The present invention will further be illustrated by the following examples.

EXAMPLE 1

The usual suspension polymerization of vinyl chloride in an aqueous medium was undertaken in a polymerization reactor of a 130 m$^3$ capacity, using 45 tons of vinyl chloride dispersed in 60 tons of water in the presence of hydroxypropylmethylcellulose and polyvinyl alcohol as the dispersing agents and 2-ethylhexylperoxydicarbonate as the polymerization initiator. After completion of the polymerization in about 90% monomer conversion, unreacted monomer was recovered by vaporization and transferred into a gas holder. Then the pressure inside the reactor and the receiver tank was equilibrated by opening the valves and the aqueous dispersion of polymerizate was transferred from the reactor to the receiver tank as described hereinbefore. Thereupon steam was blown into the reactor from the top under the pressure of 0.5 kg/cm$^2$ absolute at the nozzle, while simultaneously unreacted gaseous monomer still remaining in the reactor was dischared from the bottom of the reactor. The rates of blowing of steam in Kg/hour per square meter of the horizontal cross sectional area of the reactor and the linear velocity of steam blowing at the nozzle in m/second were varied as indicated in Table I.

Tests were conducted with the varied velocity and rates of steam blowing for 10 minutes, and at the end of such steam blowing the concentration of vinyl chloride monomer in the gas remaining in the reactor and the amount of steam consumption in each test were determined, with the results as shown in Table I.

TABLE I

| Test No. | Rate of steam blowing | Velocity of steam blowing | Monomer concentration, p.p.m. | Steam consumption, kg |
|---|---|---|---|---|
| 1 | 120 | 23 | 8.5 | 280 |
| 2 | 200 | 38 | 3.1 | 468 |
| 3 | 280 | 53 | 1.5 | 655 |
| 4 | 350 | 67 | 25.0 | 817 |

The steam thus blown into the reactor was discharged from its bottom accompanied by the gaseous vinyl chloride monomer, and sent to the condenser, wherefrom the condensation water formed was transferred to the drain tank, and the gaseous monomer freed from the steam was collected in the gas holder.

The condensation water contained 500 to 600 p.p.m. of vinyl chloride monomer according to the above tests.

The condensation water collected in the drain tank was moved to the stripper by pumping means, wherefrom the vinyl chloride monomer stripped off the water was discharged into the gas holder.

The resultant water was analyzed for monomer content to find that the monomer content was below the detectable limit by gas chromatography.

EXAMPLE 2

The same procedure as in Example 1 was repeated except that the pressure of the steam was 0.15 kg/cm$^2$ absolute at the nozzle. The results are summarized in Table II.

TABLE II

| Test No. | Rate of steam blowing | Velocity of steam blowing | Monomer concentration, p.p.m. | Steam consumption, kg |
|---|---|---|---|---|
| 5 | 90 | 50 | 2.6 | 207 |
| 6 | 160 | 89 | 1.2 | 368 |

TABLE II-continued

| Test No. | Rate of steam blowing | Velocity of steam blowing | Monomer concentration, p.p.m. | Steam consumption, kg |
|---|---|---|---|---|
| 7 | 250 | 139 | 4.3 | 575 |
| 8 | 360 | 200 | 24.0 | 828 |

As has been described herein, the essential advantage of the present invention is that unreacted vinyl chloride monomer remaining in the polymerization reactor when opened to outside atmosphere, which according to the prior art would amount to 0.20 to 0.25 kg per 100 kg of the polyvinyl chloride product and would be emitted into the atmospheric air, can be recovered almost completely without emission into the atmosphere. Taking one instance, a polyvinyl chloride manufacturing plant having a capacity of 100,000 tons per year can recover as much as 200 to 250 tons of unreacted vinyl chloride monomer in a year, when it is assumed that the polymerization reactor is opened to outside atmosphere at the end of every polymerization run for purposes of inspection. From this point of view, the method of the present invention advantageously contributes to improvement in unit of monomer used as well as to the preservation of working and natural environments.

What is claimed is:

1. Method for the production of a polymerizate of vinyl chloride monomer or a monomer mixture mainly composed thereof by polymerization in an aqueous medium contained in polymerization reactor which comprises the successive steps of (a) equilibrating the pressure inside said reactor and a receiver tank connected to said reactor after completion of the polymerization reaction, (b) removing most of the unreacted gaseous vinyl chloride monomer vapors out of said reactor, (c) transferring the aqueous dispersion of polymerizate from said reactor into said receiver tank, (d) opening said reactor to ambient atmosphere, and (e) blowing steam into said reactor from the top of the reactor prior to the step (d) of opening said reactor to ambient atmosphere at a linear velocity of steam blown into said polymerization reactor which does not exceed 150 m/second as determined at a blowing nozzle, and further at a rate of steam blown into said polymerization reactor which does not exceed 300 kg/hour per square meter of the horizontal cross sectional area of said reactor, whereby any unreacted gaseous monomer still remaining in said reactor is pushed downward and moved out from the bottom of said reactor.

2. The method as claimed in claim 1, wherein the wall of said polymerization reactor is heated by passing hot water through a surrounding jacket to prevent the steam blowing thereinto from being condensed on the wall surfaces.

3. The method as claimed in claim 1, wherein the total volume of the steam blown into said polymerization reactor is at least three times the volume of said reactor.

* * * * *